United States Patent
Takeyasu

(10) Patent No.: US 11,120,292 B2
(45) Date of Patent: Sep. 14, 2021

(54) DISTANCE ESTIMATION DEVICE, DISTANCE ESTIMATION METHOD, AND DISTANCE ESTIMATION COMPUTER PROGRAM

(71) Applicant: TOYOTA JIDOSHA KABUSHIKI KAISHA, Toyota (JP)

(72) Inventor: Satoshi Takeyasu, Musashino (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/896,799

(22) Filed: Jun. 9, 2020

(65) Prior Publication Data
US 2020/0394435 A1 Dec. 17, 2020

(30) Foreign Application Priority Data
Jun. 11, 2019 (JP) .............................. JP2019-108602

(51) Int. Cl.
*G06K 9/00* (2006.01)
*G06K 9/52* (2006.01)
*G06K 9/62* (2006.01)

(52) U.S. Cl.
CPC ........... *G06K 9/52* (2013.01); *G06K 9/00805* (2013.01); *G06K 9/6277* (2013.01)

(58) Field of Classification Search
None
See application file for complete search history.

(56) References Cited

U.S. PATENT DOCUMENTS

| 9,058,524 B2* | 6/2015 | Kuehnle | ............ G06K 9/00805 |
| 2015/0139534 A1 | 5/2015 | Komatsu | |
| 2020/0180656 A1* | 6/2020 | Kim | ................... G06K 9/00825 |
| 2020/0327343 A1* | 10/2020 | Lund | ........................ G06T 7/70 |

FOREIGN PATENT DOCUMENTS

| JP | 2002-327635 A | 11/2002 |
| JP | 2015-096812 A | 5/2015 |

\* cited by examiner

*Primary Examiner* — Soo Jin Park
(74) *Attorney, Agent, or Firm* — Hunton Andrews Kurth LLP

(57) ABSTRACT

A distance estimation device includes: a processor configured to detect the predetermined object represented in an image acquired by a camera, and calculate a confidence score that, for each of the plurality of types of the predetermined object, the detected object belongs to the type, estimate a size in the real space of the detected object by weighted-averaging a reference size in a real space of each of the plurality of types by the confidence score of the type, and estimate a distance to the detected object on the basis of a ratio between the detected size of the predetermined object on the image and an estimated size of the detected object on the image when a distance to the detected object is a predetermined reference distance, which corresponds to the estimated size in the real space of the detected object.

5 Claims, 5 Drawing Sheets

DISTANCE ESTIMATION DEVICE, DISTANCE ESTIMATION METHOD, AND DISTANCE ESTIMATION COMPUTER PROGRAM

CROSS-REFERENCE TO RELATED APPLICATION

This application claims priority to Japanese Patent Application No. 2019-108602 filed on Jun. 11, 2019, which is incorporated herein by reference in its entirety.

FIELD

The present invention relates to a distance estimation device, a distance estimation method, and a distance estimation computer program that estimate a distance to an object represented in an image.

BACKGROUND

A technique for estimating a distance to an object represented in an image has been studied (e.g., Japanese Unexamined Patent Application Publication (Kokai) No. 2002-327635). For example, estimating a distance between cars on the basis of a horizontal or vertical edge width of a vehicle in front being represented in an image and an actual horizontal or vertical width estimation value has been proposed in Japanese Unexamined Patent Application Publication (Kokai) No. 2002-327635.

SUMMARY

In the technique described in Japanese Unexamined Patent Application Publication (Kokai) No. 2002-327635, as an error of an actual width in a real space of an object being a target for distance estimation is larger, an error of an estimated distance increases.

Therefore, an object of the present invention is to provide a distance estimation device capable of improving estimation accuracy of a distance to an object represented in an image.

According to one embodiment, a distance estimation device is provided. The distance estimation device includes: a memory configured to store, for each of a plurality of types of a predetermined object, a reference size in a real space of the type; and a processor configured to detect the object represented in an image acquired by a camera; calculate, by inputting the image to a classifier that calculates a confidence score representing likelihood that, for each of the plurality of types, the detected object belongs to the type, a size of the detected object and the confidence score for each of the plurality of types; estimate a size in the real space of the detected object by weighted-averaging the reference size of each of the plurality of types by the confidence score of the type; and estimate a distance to the detected object, based on a ratio between the size of the detected object on the image and an estimated size of the detected object on the image when a distance to the detected object is a predetermined reference distance, which corresponds to the estimated size in the real space of the detected object.

In the distance estimation device, it is preferable that the predetermined object is a vehicle.

In addition, in the distance estimation device, it is preferable that the predetermined object is a human or a vehicle on which a human being exposed rides, and the reference size of each of the plurality of types and a size of the object on the image are a length in a direction vertical to a road surface.

According to another embodiment of the present invention, a distance estimation method is provided. The distance estimation method includes: detecting a predetermined object represented in an image acquired by a camera; calculating, by inputting the image to a classifier that calculates a confidence score representing likelihood that, for each of a plurality of types of the predetermined object, the detected object belongs to the type, a size of the detected object and the confidence score for each of the plurality of types; estimating a size in the real space of the detected object by weighted-averaging, for each of the plurality of types, a reference size in the real space of the type being stored in a memory by the confidence score of the type; and estimating a distance to the detected object, based on a ratio between the size of the detected object on the image and an estimated size of the detected object on the image when a distance to the detected object is a predetermined reference distance, which corresponds to then estimated size in the real space of the detected object.

According to still another embodiment of the present invention, a non-transitory recording medium in which a distance estimation computer program is recorded is provided. The estimation computer program causes a computer to execute: detecting a predetermined object represented in an image acquired by a camera; calculating, by inputting the image to a classifier that calculates a confidence score representing likelihood that for each of a plurality of types of the predetermined object, the detected object belongs to the type, a size of the detected object and the confidence score for each of the plurality of types; estimating a size in the real space of the detected object by weighted-averaging, for each of the plurality of types, a reference size in the real space of the type being stored in a memory by the confidence score of the type; and estimating a distance to the detected object, based on a ratio between the size of the detected object on the image and an estimated size of the detected object on the image when a distance to the detected object is a predetermined reference distance, which corresponds to the estimated size in the real space of the detected object.

A distance estimation device according to the present invention provides an advantageous effect of being able to improve estimation accuracy of a distance to an object represented in an image.

DESCRIPTION OF EMBODIMENTS

Figure 1:
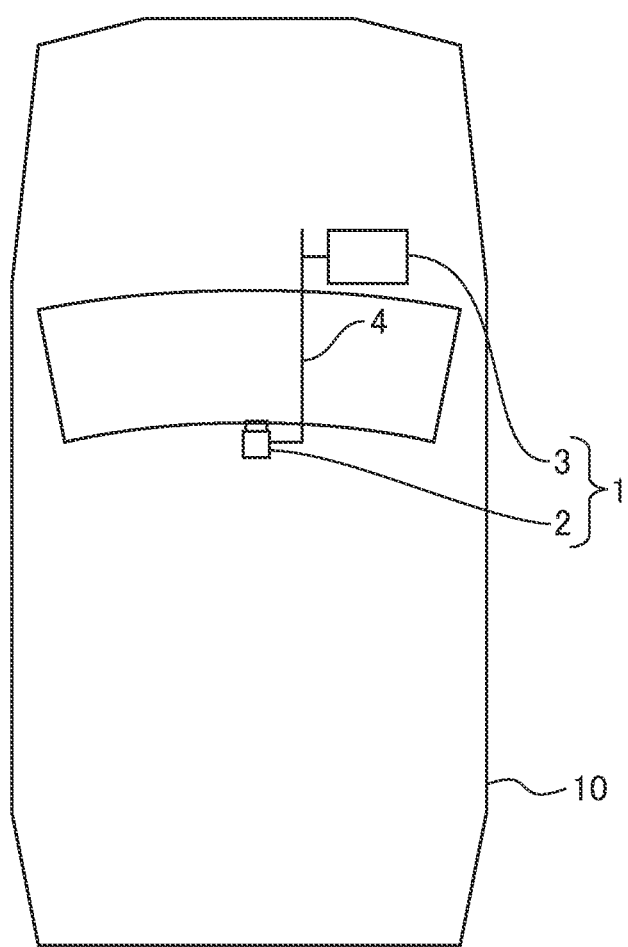
FIG. 1 is a schematic configuration diagram of a vehicle control system in which a distance estimation device is installed.

A distance estimation device will be described below with reference to the drawings. The distance estimation device detects an object to be detected that is represented in an image acquired by an imaging unit, and estimates a distance from the imaging unit to the object. In particular, the distance estimation device previously defines, for each type of the object, a reference size representing a size in a real space of the type of the object used as a reference, and estimates a distance to the object by using the reference size and a size of the object on the image.

For each type of an object to be detected, the reference size of the type of the object is set, and thus a real size of any object among objects belonging to the same type may be different from the reference size. For example, in the case where a type of an object to be detected is a bus, since various buses exist, a bus whose size differs from a reference size of bus also exists. For example, it is assumed that a size of a small bus such as a microbus is smaller than the reference size of bus. Then, when the reference size of an object to be detected is used as the size of the object for estimating a distance, as a difference between a real size of the object and the reference size of the object is greater, an error of an estimation result of a distance to the object increases.

Further, when a real size of a certain object is smaller than a reference size for a type of the object, an appearance of the object may be similar to an appearance of another type of object having a smaller reference size. Thus, the object represented on an image is more likely to be mistakenly recognized as another type of object having a smaller reference size. For example, a difference between an appearance of a microbus and an appearance of a larger standard-sized passenger car having a reference size smaller than that of a microbus is small. Thus, when an object to be detected is a microbus, the microbus represented in an image is more likely to be mistakenly recognized as a standard-sized passenger car having a smaller reference size. Similarly, when a real size of a certain object is larger than a reference size of a type of the object, an appearance of the object may be similar to another type of object having a larger reference size. Thus, the object represented on an image is more likely to be mistakenly recognized as another type of object having a larger reference size. In this way, as a difference between a reference size and a real size of an object, the object is more likely to be mistakenly recognized as another type of object having a different reference size close to the real size. Therefore, it is conceivable that, by weighted-averaging, for each type assumed for an object represented in an image, a reference size of the type by likelihood that the object is the type, a real size of the object can be more accurately estimated.

Thus, the distance estimation device detects, by inputting an image acquired by the imaging unit to a classifier, a region in which an object to be detected on the image is represented, and also calculates, for each of a plurality of types estimated as a type of the object, a confidence score representing likelihood that the object belongs to the type. Then, the distance estimation device estimates a size in a real space of the object detected from the image by weighted-averaging, for each of the plurality of types, a reference size of the type of the object by the confidence score of the type. Then, the distance estimation device estimates a distance from the imaging unit to the object by using the estimated size in the real space of the object.

An example in which the distance estimation device is applied to a vehicle control system will be described below. In this example, the distance estimation device detects an object to be detected that exists around a vehicle by executing distance estimation processing on an image acquired by a camera installed in the vehicle, estimates a distance to the detected object, and uses a detection result of the object and an estimation value of the distance to the detected object for driving control of the vehicle.

Further, in this example, an object to be detected is classified as any of classes representing a set of types of objects having the same attribute, such as a "vehicle", a "human", and an "on-street stationary object", for example. Further, a type belonging to a "vehicle" class includes, for example, a "standard-sized passenger car", a "bus", a "truck", and the like. Furthermore, a type belonging to a "human" class includes, for example, a "pedestrian", a "person who rides a bicycle", and the like. Still further, a type belonging to an "on-street stationary object" class includes, for example, a "road sign", "traffic lights", and the like.

Figure 2:
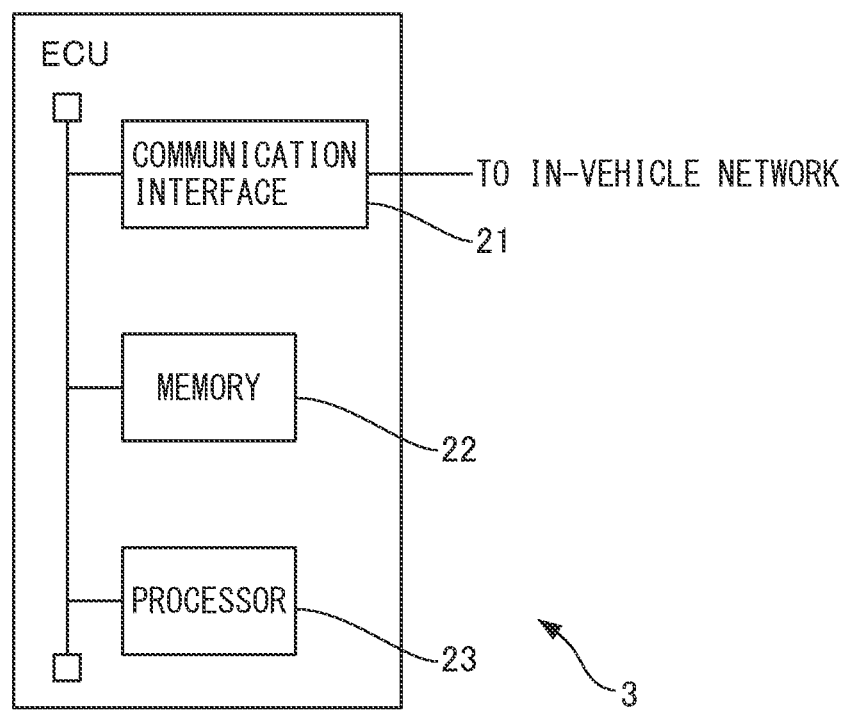
FIG. 2 is a hardware configuration diagram of an electronic control unit being one embodiment of the distance estimation device.

FIG. 1 is a schematic configuration diagram of a vehicle control system in which a distance estimation device is installed. Further, FIG. 2 is a hardware configuration diagram of an electronic control unit according to one embodiment of the distance estimation device. In the present embodiment, a vehicle control system 1 that is installed in a vehicle 10 and controls the vehicle 10, includes a camera 2 for capturing the surroundings of the vehicle 10 and an electronic control unit (ECU) 3 according to one example of the distance estimation device. The camera 2 and the ECU 3 are communicatively connected via an in-vehicle network 4 conforming to a standard such as a controller area network.

The camera 2 is one example of an imaging unit, and includes a two-dimensional detector configured with an array of photoelectric conversion elements having sensitivity to visible light such as a CCD or a C-MOS and an imaging optical system that forms an image of a region to be captured on the two-dimensional detector. Then, the camera 2 is mounted, for example, inside a vehicle room of the vehicle 10 in such a way as to be oriented in a forward direction of the vehicle 10. Then, the camera 2 captures a forward region of the vehicle 10 at predetermined capturing periods (e.g., 1/30 seconds to 1/10 seconds), and generates an image in which the forward region is captured. An image acquired by the camera 2 may be a color image or a gray image. Note that a plurality of cameras having different capturing directions or different focal distances may be provided in the vehicle 10.

Every time the camera 2 generates an image, the camera 2 outputs the generated image to the ECU 3 via the in-vehicle network 4.

The ECU 3 controls the vehicle 10. In the present embodiment, the ECU 3 controls the vehicle 10 in such a way as to automatically drive the vehicle 10 on the basis of an object detected from a series of time-series images acquired by the camera 2. For this purpose, the ECU 3 includes a communication interface 21, a memory 22, and a processor 23.

The communication interface 21 is one example of an in-vehicle communication unit, and includes an interface circuit for connecting the ECU 3 to the in-vehicle network 4. In other words, the communication interface 21 is connected to the camera 2 via the in-vehicle network 4. Every time the communication interface 21 receives an image from the camera 2, the communication interface 21 passes the received image to the processor 23.

The memory 22 is one example of a storage unit, and includes, for example, a volatile semiconductor memory and a non-volatile semiconductor memory. Note that, when the processor 23 includes a plurality of arithmetic units as described later, the memory 22 may include a dedicated memory circuit for each of the arithmetic units. The memory 22 stores various types of data used in distance estimation processing and vehicle control processing executed by the processor 23 of the ECU 3. For example, the memory 22 stores an image received from the camera 2, various types of parameters for specifying a classifier (e.g., a first classifier for object detection and a second classifier for confidence score calculation) used in the distance estimation processing, an internal parameter of the camera 2, a reference distance, a reference size for each type of an object to be detected, and the like. Furthermore, the memory 22 may store map information and the like. Still further, the memory 22 temporarily stores various types of data generated during the distance estimation processing and the vehicle control processing.

The processor 23 is one example of a control unit, and includes one or a plurality of central processing units (CPUs) and peripheral circuits thereof. The processor 23 may further include another arithmetic circuit such as a logical arithmetic unit, a numerical arithmetic unit, or a graphic processing unit. While the vehicle 10 is traveling, every time the processor 23 receives an image from the camera 2, the processor 23 executes the distance estimation processing on the received image. Furthermore, the processor 23 controls the vehicle 10 in such a way as to automatically drive the vehicle 10 on the basis of an object around the vehicle 10 detected from the received image.

Figure 3:
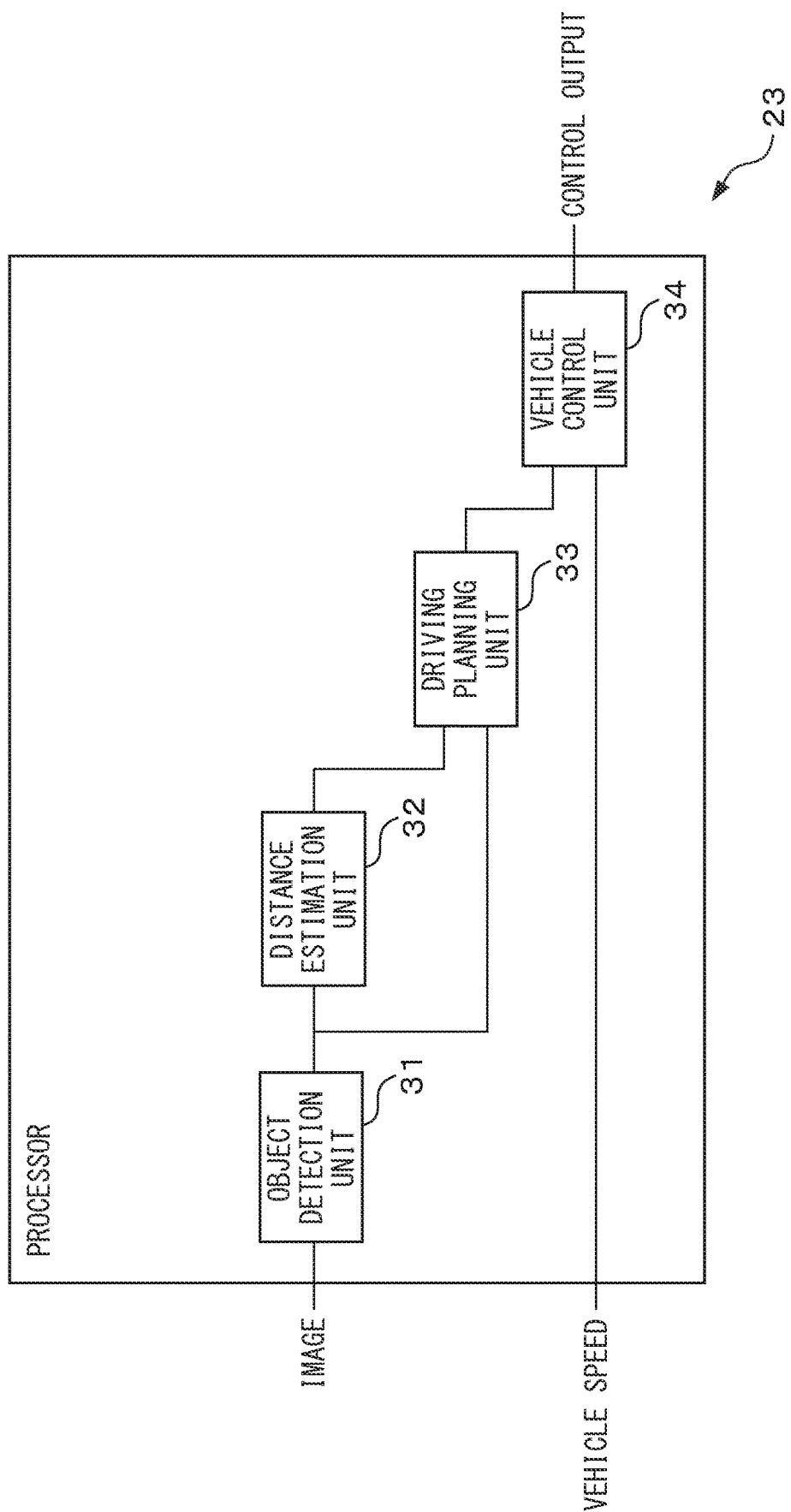
FIG. 3 is a functional block diagram of a processor of the electronic control unit, relating to vehicle control processing including distance estimation processing.

FIG. 3 is a functional block diagram of the processor 23 of the ECU 3, relating to the vehicle control processing including the distance estimation processing. The processor 23 includes an object detection unit 31, a distance estimation unit 32, a driving planning unit 33, and a vehicle control unit 34. Each of these units included in the processor 23 is, for example, a function module achieved by a computer program operating on the processor 23. Alternatively, each of these units included in the processor 23 may be a dedicated arithmetic circuit provided in the processor 23. Among the respective units included in the processor 23, the object detection unit 31 and the distance estimation unit 32 execute the distance estimation processing on the basis of an image acquired by the camera 2. Note that, when a plurality of cameras are provided in the vehicle 10, the processor 23 may execute, for each of the cameras, the distance estimation processing on the basis of an image acquired by the camera.

The object detection unit 31 detects, for each of a series of time-series images generated by the camera 2, an object to be detected that is captured in the image, and identifies a region (e.g., a circumscribed rectangle of the object to be detected, and hereinafter referred to as an object region) in which the object is represented. Furthermore, the object detection unit 31 calculates a confidence score for each of a plurality of types belonging to a class of the object to be detected.

For example, every time the object detection unit 31 acquires an image from the camera 2, the object detection unit 31 stores the image in the memory 22, and detects, by inputting the image to the first classifier for object detection, an object to be detected that is represented in the input image. For example, the object detection unit 31 can use, as the first classifier, a deep neural network (DNN) which has been trained in advance in such a way as to detect, from an input image, an object represented in the image. The object detection unit 31 can use, as such a DNN, a DNN having a convolutional neural network (CNN) type architecture, such as a Single Shot MultiBox Detector (SSD) (see Wei Lui and other, "SSD: Single Shot MultiBox Detector", ECCV2016, 2016) or a Faster R-CNN (see Shaoqing Ren and other, "Faster R-CNN: Towards Real-Time Object Detection with Region Proposal Networks", NIPS, 2015), for example. In this case, the object detection unit 31 inputs an image to the first classifier of the DNN type, and thus the first classifier calculates, for each class (e.g., a vehicle, a human, and an on-street stationary object) of an object to be detected in various regions on the input image, a confidence score representing likelihood that the object is represented in the region. Then, the object detection unit 31 determines that, in a region in which a confidence score for any class is equal to or more than a predetermined detection threshold value, the object in the class is represented. For example, when a confidence score calculated for a "vehicle" is equal to or more than a confidence score threshold value in a certain region on an image, the first classifier determines that the "vehicle" is represented in the region. Then, the first classifier outputs information representing an object region on the input image, and information representing the class of the object represented in the object region.

Alternatively, the object detection unit 31 may use, as the first classifier, a classifier other than the DNN. For example, the object detection unit 31 may use, as the first classifier, a support vector machine (SVM) which has been trained in advance in such a way as to output, using a feature (e.g., Histograms of Oriented Gradients, HOG) calculated with respect to a window set on an image as an input, a confidence score that an object to be detected is represented in the window. The object detection unit 31 calculates, while variously changing a position, a size, and an aspect ratio of the window to be set on the image, the feature with respect to the window, and calculates the confidence score with respect to the window by inputting the calculated feature to the SVM. When the confidence score is equal to or more than a predetermined detection threshold value, the object detection unit 31 then determines the window as an object region in which the object to be detected is represented.

When the object region in which the object to be detected is represented is identified on the image, the object detection unit 31 calculates a confidence score for each type belonging to a class of the object by inputting the identified object region to the second classifier. For example, when the "vehicle" is detected in the object region, the second classifier calculates a confidence score for each of a "standard-sized passenger car", a "bus", and a "truck" that are types belonging to the class of the "vehicle". The object detection unit 31 can use, as the second classifier, a CNN which has been trained in advance in such a way as to calculate, from an input object region, a confidence score for each type of an object represented in the object region, for example. Further, the object detection unit 31 can use, as the second classifier, a classifier other than the CNN, such as the SVM which has been trained in advance in such a way as to calculate a confidence score for each type of an object represented in an object region, for example. Note that, as described below in detail, it is preferable that a total of confidence scores for each type of an object is 1 in such a way that the distance estimation unit 32 can use the confidence score as a weighting factor in a weighted average of reference sizes. Thus, an output layer of the CNN used as the second classifier can be, for example, a softmax layer.

Note that the second classifier may be prepared for each class of an object and be previously stored in the memory 22 in association with the class. Then, the object detection unit 31 may read, from the memory 22, the second classifier corresponding to a class of an object detected by the first classifier, and use the classifier for calculating a confidence score for each type. In this way, the number of types of an object to be trained is reduced for the individual second classifier, and thus the object detection unit 31 can improve calculation accuracy of a confidence score for each type even when a classifier with a relatively small calculation amount is used as the second classifier.

Alternatively, by using one classifier, the object detection unit 13 may detect an object to be detected that is represented on an image and calculate a confidence score for each type belonging to a class of the object. In this case, as described above in relation to the first classifier, for example, the classifier can be the DNN, such as the SSD or the Faster-RCNN, which has been trained in such a way as to detect an object region in which the object to be detected is represented and calculate a confidence score for each type of the object represented in the object region. In this case, the classifier can detect an object region similarly to the first classifier described above. However, in this example, the classifier calculates, for each object region, a confidence score for each type belonging to another class in addition to the class of the object to be detected. Accordingly, the object detection unit 31 selects, for each object region, a class to which a type having a maximum confidence score calculated for the object region belongs, and determines that the object in the selected class is represented in the object region. Then, the object detection unit 31 normalizes, for each object region, a confidence score of each type belonging to the class of the object represented in the object region by a total of confidence scores for each type belonging to the class. The object detection unit 31 may set, for each type belonging to the class, the normalized confidence score as a confidence score of the type. In this way, a total of confidence scores for each type belonging to the class of the object represented in the object region is 1. For example, it is assumed that, for an object region of interest, a confidence score calculated for the "bus" belonging to the class of the "vehicle" is higher than a confidence score calculated for another type. In this case, the object detection unit 31 determines that the object in the "vehicle" class is represented in the object region of interest. Then, the object detection unit 31 may normalize a confidence score of each of the "standard-sized passenger car", the "bus", and the "truck" by dividing the confidence score calculated for each of the "standard-sized passenger car", the "bus", and the "truck" belonging to the "vehicle" class by the classifier by a total of the confidence scores. For example, it is assumed that the confidence score calculated for the "standard-sized passenger car" is 0.3, the confidence score calculated for the "bus" is 0.5, and the confidence score calculated for the "truck" is 0.4. In this case, the normalized confidence score for the "standard-sized passenger car" is 0.25 (=0.3/(0.3+0.4+0.5)), the normalized confidence score for the "bus" is 0.42 (=0.5/(0.3+0.4+0.5)), and the normalized confidence score for the "truck" is 0.33 (=0.4/(0.3+0.4+0.5).

The object detection unit 31 outputs a position and a range of the object region detected from the image and the confidence score for each type belonging to the class of the detected object to the distance estimation unit 32 and the driving planning unit 33.

The distance estimation unit 32 estimates a distance from the camera 2 to the object detected from the image. In the present embodiment, the distance estimation unit 32 estimates, by executing the following processing for each object region detected by the object detection unit 31, a distance to the object represented in the object region.

The distance estimation unit 32 reads, from the memory 22, for each type belonging to the class of the object represented in the object region of interest, a reference size $Srj$ (j=1, 2, . . . m| m is the number of types) of the type and a reference distance dr. Then, the distance estimation unit 32 estimates a size $Srp$ in a real space of the object represented in the object region of interest by weighted-averaging, for each of a plurality of types belonging to the class of the object represented in the object region of interest, the reference size of the type by the confidence score of the type. In other words, the estimated size $Srp$ of the object in the real space is calculated by the following equation.

$$Srp = \Sigma_{j=1}^{m} w_j Sr_j \qquad (1)$$

Wherein, a weighting factor $w_j$ (j=1, 2, . . . , m) is a confidence score calculated for a type j. For example, it is assumed that the class of the object represented in the object region of interest is the "vehicle", a confidence score calculated for the "bus" is 0.1, and confidence scores calculated for the "standard-sized passenger car" and the "truck" are each 0.45. Further, it is assumed that a reference size of the "bus" is 2.5 m, a reference size of the "standard-sized passenger car" is 1.8 m, and a reference size of the "truck" is 2.2 m. In this case, the estimated size $Srp$ of the object in the real space is 0.1×2.5+0.45×1.8+0.45×2.2=2.05 m.

The distance estimation unit 32 calculates, for the object represented in the object region of interest, an estimated reference size $Sip$ of the object on an image when a distance to the object is the predetermined reference distance dr, which corresponds to the estimated size $Srp$ in the real space of the object. Then, the distance estimation unit 32 estimates, as a distance from the camera 2 to the object represented in the object region of interest, a value acquired by multiplying the reference distance dr by a ratio ($Sip/Si$) of the estimated reference size $Sip$ to a size $Si$ of the object.

Note that the distance estimation unit 32 can set a size in a horizontal direction or a vertical direction of the object when seen from a direction assumed to be seen from the camera 2 as a reference size. In the present embodiment, the camera 2 is mounted in such a way to capture the front of the vehicle 10, and thus it is assumed that the object of the type belonging to the "vehicle" class travels in front of the vehicle 10 or travels in an opposite lane toward the vehicle 10. Thus, the reference size of the object of the type belonging to the "vehicle" class can be, for example, a length in the horizontal direction (i.e., a width) or a length in the vertical direction (i.e., a height from a road surface) when the object is seen from the front or the rear. Further, an object of a type belonging to the "road surface stationary object" class is installed in such a way that the front of the object can be seen from the traveling vehicle 10. Thus, the reference size of the object of the type belonging to the "road surface stationary object" class can be a length in the horizontal direction or a length in the vertical direction when the object is seen from a front direction. Furthermore, an object of a type belonging to the "human" class varies in length in the horizontal direction depending on an orientation in which the object is seen, but a length in the vertical direction is substantially constant regardless of the orientation in which the object is seen. Furthermore, the object of the type belonging to the "human" class has a more significant difference in length depending on the type in the vertical direction than that in the horizontal direction. Thus, it is preferable that the reference size of the object of the type belonging to the "human" class is a length of the object in the direction vertical to the road surface (i.e., a height) in such a way that a real size of the object belonging to the "human" class can be accurately estimated.

Further, the reference distance can be, for example, a distance at which an object is represented on an image acquired by the camera 2 such a way that a size of the object on the image changes depending on a size in real space of the object, e.g., 10 to 30 m. Furthermore, a size of an object represented in an image being used for distance estimation can be, for example, a width of an object region in a direction on the image corresponding to a direction in a real space in which a reference size is defined. For example, when a reference size of an object is a length in the horizontal direction of the object, a size of the object represented in an image can be a width in the horizontal direction of an object region in which the object is represented. Further, when a reference size of an object is a length in the vertical direction of the object, a size of the object represented in an image can be a height in the vertical direction of an object region in which the object is represented.

Furthermore, the distance estimation unit 32 can calculate the estimated reference size Sip of an object on an image when a distance to the object is the predetermined reference distance dr, which corresponds to the estimated size Srp in a real space of the object, by using an internal parameter of the camera 2. The internal parameter of the camera 2 includes, for example, a focal distance of the camera 2, an angle of view, a horizontal direction size and a vertical direction size of each pixel, a relationship between a distance from an image center and an amount of distortion, and the like.

Figure 4:
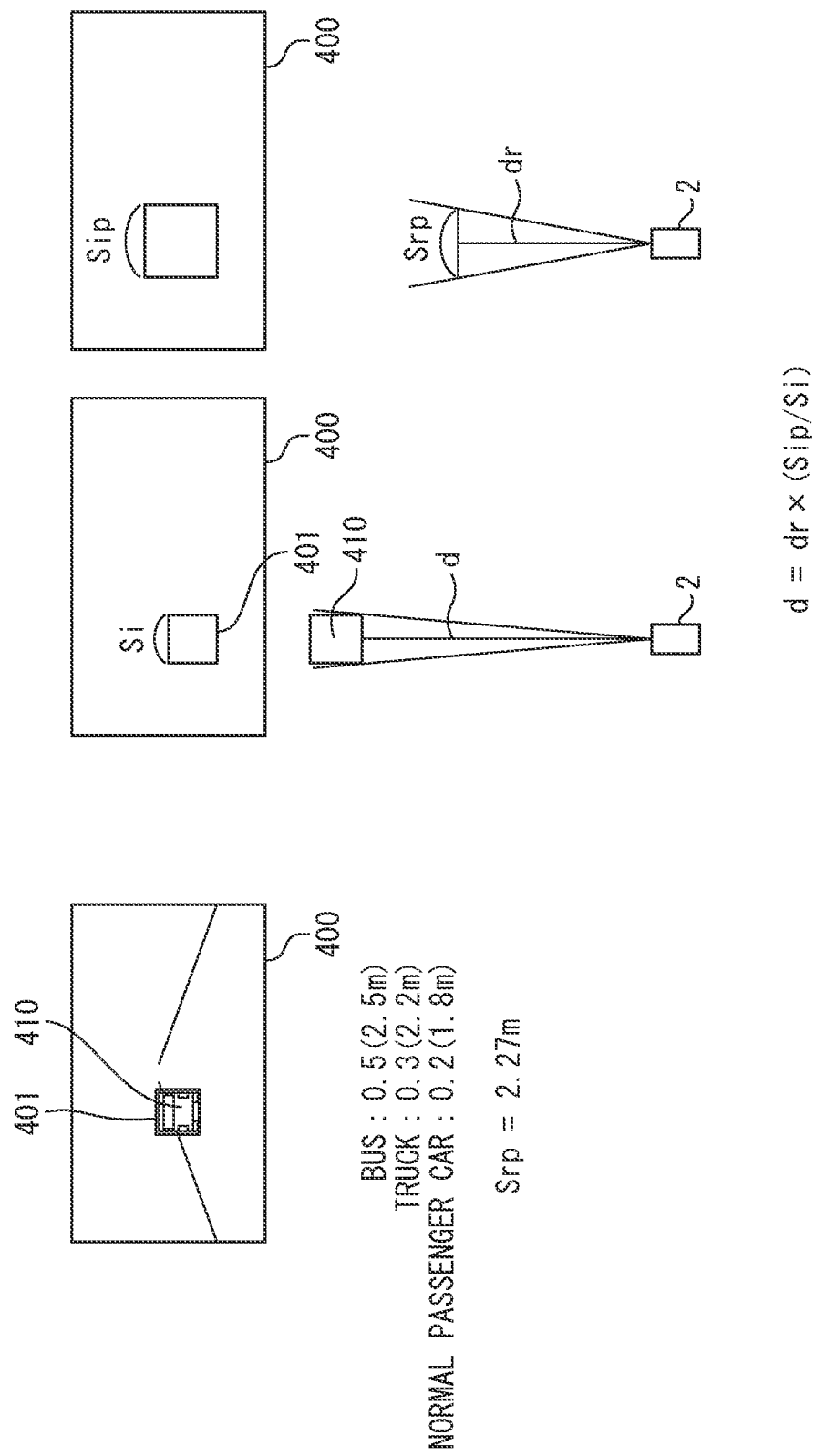
FIG. 4 is a diagram explaining an outline of the distance estimation processing.

FIG. 4 is a diagram explaining an outline of the distance estimation processing. As illustrated in FIG. 4, a vehicle 410 is detected in an object region 401 on an image 400 acquired by the camera 2, and it is assumed that, in relation to the vehicle 410, a confidence score calculated for the "bus" is 0.5, a confidence score calculated for the "truck" is 0.3, and a confidence score calculated for the "standard-sized passenger car" is 0.2. Further, it is assumed that a reference size of the "bus" is 2.5 m, a reference size of the "standard-sized passenger car" is 1.8 m, and a reference size of the "truck" is 2.2 m. In this case, the estimated size Srp in a real space of the vehicle 410 becomes 2.27 m. Then, for example, it is assumed that, when the reference distance dr is 20 m, the estimated reference size Sip of the vehicle 410 on the image 400 which is calculated from the internal parameter of the camera 2 and the estimated size Srp is 75 pixels. Further, it is assumed that the size Si of the vehicle 410 on the image 400 (in this example, a width in the horizontal direction of the object region 401) is 50 pixels. In this case, a distance d from the camera 2 to the vehicle 410 is estimated to be br×(Sip/Si)=20×(75/50)=30 m.

The distance estimation unit 32 notifies, for each object region, the driving planning unit 33 of the estimated distance to the object represented in the object region.

The driving planning unit 33 generates one or more planned traveling routes (trajectories) to be traveled of the vehicle 10 in such a way that an object detected for each image and existing around the vehicle 10 does not collide with the vehicle 10. A planned traveling route is represented as, for example, a set of target positions for the vehicle 10 at each time from a current time to a certain time later. For example, the driving planning unit 33 tracks each object detected from a series of images acquired by the camera 2, and estimates a predicted path of each object up to a certain time later, on the basis of a path acquired by a tracking result. At this time, the driving planning unit 33 can estimate a position of the detected object when each image is acquired, from a current position and a current posture of the vehicle 10, the estimated distance to the detected object by the distance estimation unit 32, and a direction from the vehicle 10 toward the object when each image is acquired.

Note that the position and the posture of the vehicle 10 are estimated by using a GPS signal and the like received by a GPS receiver (not illustrated) installed in the vehicle 10. Alternatively, the position and the posture of the vehicle 10 may be estimated by detecting, every time an image is acquired by the camera 2, left and right lane division lines of the vehicle 10 from the image and matching the detected lane division lines with map information stored in the memory 22 by a localize processing unit (not illustrated). Further, the direction from the vehicle 10 toward the object is acquired from a position of the object on the image and an installation position and an installation orientation of the camera 2 with respect to the vehicle 10. Then, the driving planning unit 33 can track the detected object by executing tracking processing using the Kalman filter, a particle filter, or the like on the estimated position of the detected object when each image is acquired.

The driving planning unit 33 generates, on the basis of the estimated path for each object being tracked, a planned traveling route of the vehicle 10 in such a way that, for any object, an estimated value of the distance between each object being tracked and the vehicle 10 is equal to or greater than a certain distance until a certain time later. At this time, the driving planning unit 34 may confirm, for example, with reference to a current position of the vehicle 10 and map information stored in the memory 22, the number of lanes in which the vehicle 10 can travel. When there are a plurality of lanes in which the vehicle 10 can travel, the driving planning unit 33 may generate a planned traveling route in such a way as to change the lane in which the vehicle 10 travels.

Note that the driving planning unit 33 may generate a plurality of planned traveling routes. In this case, among the plurality of planned traveling routes, the driving planning unit 33 may select a route in which a sum of absolute values of acceleration of the vehicle 10 is minimum.

The driving planning unit 33 notifies the vehicle control unit 34 of the generated planned traveling route.

The vehicle control unit 34 controls each unit of the vehicle 10 in such a way that the vehicle 10 travels along the notified planned traveling route. For example, the vehicle control unit 34 calculates an acceleration of the vehicle 10 in accordance with the notified planned traveling route and a current vehicle speed of the vehicle 10 measured by a vehicle speed sensor (not illustrated), and sets an accelerator position or a braking amount in such a way as to achieve the calculated acceleration. Then, the vehicle control unit 34 calculates an amount of fuel injection depending on the set accelerator position, and outputs a control signal in response to the amount of fuel injection to a fuel injection device of an engine of the vehicle 10. Alternatively, the vehicle control unit 34 outputs a control signal in response to the set braking amount to a brake of the vehicle 10.

Furthermore, when the vehicle 10 changes the course in order to travel along a planned traveling route, the vehicle control unit 34 calculates a steering angle for the vehicle 10 in accordance with the planned traveling route, and outputs a control signal in response to the calculated steering angle to an actuator (not illustrated) that controls a steering wheel of the vehicle 10.

Figure 5:
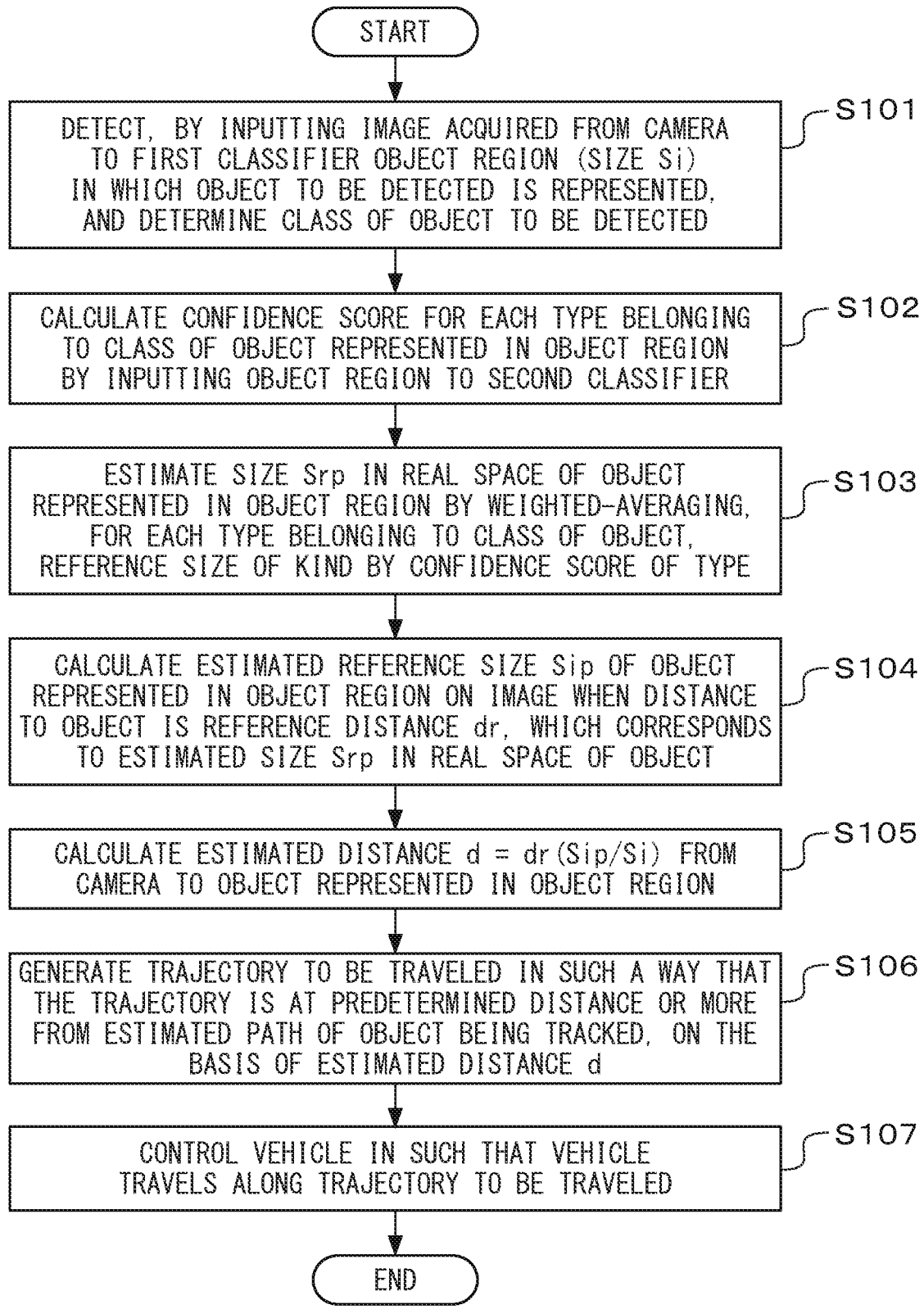
FIG. 5 is an operation flowchart of the vehicle control processing including the distance estimation processing.

FIG. 5 is an operation flowchart of the vehicle control processing including the distance estimation processing executed by the processor 23. Every time the processor 23 receives an image from the camera 2, the processor 23 executes the vehicle control processing in accordance with the operation flowchart illustrated in FIG. 5. Note that, in the operation flowchart indicated below, processing steps from steps S101 to S105 correspond to the distance estimation processing.

The object detection unit 31 of the processor 23 determines, by inputting the newest image acquired from the camera 2 to the first classifier, an object region in which an object to be detected that is represented in the image is included, and determines a class of the object (step S101). Then, the object detection unit 31 calculates a confidence score for each type of the object belonging to the class of the object represented in the object region by inputting the object region to the second classifier (step S102).

The distance estimation unit 32 of the processor 23 estimates the size Srp in a real space of the object represented in the object region by weighted-averaging, for each of a plurality of types belonging to the class of the object, a reference size of the type by the confidence score of the type (step S103). Further, the distance estimation unit 32 calculates the estimated reference size Sip of the object on an image when a distance to the object is the predetermined reference distance dr, which corresponds to the estimated size Srp in the real space of the object, by using an internal parameter of the camera 2 (step S104). Then, the distance estimation unit 32 estimates, as the distance d from the camera 2 to the object represented in the object region, a value acquired by multiplying the reference distance dr by a ratio (Sip/Si) of the estimated reference size Sip to the size Si of the object (step S105).

The driving planning unit 33 of the processor 23 tracks the object detected from the newest image by associating the object with an object detected from a past image, and generates a planned traveling route of the vehicle 10 in such a way that the planned traveling route is at a predetermined distance or more from an estimated path of the object being estimated on the basis of a tracking result, on the basis of the estimated distance d in each image (step S106). Then, the vehicle control unit 34 of the processor 23 controls the vehicle 10 in such a way that the vehicle 10 travels along the planned traveling route (step S107). Then, the processor 23 ends the vehicle control processing.

As described above, the distance estimation device detects, by inputting an image acquired by an imaging unit to a classifier, a region in which an object to be detected on an image is represented, and calculates a confidence score that, for each of a plurality of types belonging to a class of the object, the object belongs to the type. The distance estimation device estimates a size in a real space of the object detected from the image by weighted-averaging, for each of the plurality of types, a reference size in the real space of the object of the type by the confidence score of the type. Thus, the distance estimation device can improve estimation accuracy of the size of the object in the real space. Then, the distance estimation device estimates a distance to the estimated object on the basis of the size in the real space of the object, and thus the distance estimation device can also improve estimation accuracy of the distance to the object.

The distance estimation device according to the embodiment or the modification example described above may be installed in other than in-vehicle equipment. For example, the distance estimation device according to the embodiment or the modification example described above may be configured to detect an object from an image generated by a surveillance camera installed in such a way as to capture a predetermined outdoor or indoor region at each predetermined period, and estimate a distance to the detected object.

Further, a computer program that achieves a function of each unit of the processor 23 of the distance estimation device according to the embodiment or modification example described above may be provided in form of being recorded in a computer-readable portable recording medium, such as a semiconductor memory, a magnetic recording medium, or an optical recording medium.

As described above, those skilled in the art may make various changes in conformity to an embodiment within the scope of the present invention.

What is claimed is:

1. A distance estimation device comprising:
  a memory configured to store, for each of a plurality of types of a predetermined object, a reference size in a real space of the type; and
  a processor configured to
    detect the object represented in an image acquired by a camera;
    calculate, by inputting the image to a classifier that calculates a confidence score representing likelihood that, for each of the plurality of types, the detected object belongs to the type, a size of the detected object and the confidence score for each of the plurality of types;
    estimate a size in the real space of the detected object by weighted-averaging the reference size of each of the plurality of types by the confidence score of the type; and
    estimate a distance to the detected object, based on a ratio between the size of the detected object on the image and an estimated size of the detected object on the image when a distance to the detected object is a predetermined reference distance, which corresponds to the estimated size in the real space of the detected object.

2. The distance estimation device according to claim 1, wherein the predetermined object is a vehicle.

3. The distance estimation device according to claim 1, wherein the predetermined object is a human or a vehicle on which a human being exposed rides, and the reference size of each of the plurality of types and a size of the object on the image are a length in a direction vertical to a road surface.

4. A distance estimation method comprising:
  detecting a predetermined object represented in an image acquired by a camera;
  calculating, by inputting the image to a classifier that calculates a confidence score representing likelihood that, for each of a plurality of types of the predetermined object, the detected object belongs to the type, a size of the detected object and the confidence score for each of the plurality of types;
  estimating a size in the real space of the detected object by weighted-averaging, for each of the plurality of types, a reference size in the real space of the type being stored in a memory by the confidence score of the type; and
  estimating a distance to the detected object, based on a ratio between the size of the detected object on the image and an estimated size of the detected object on the image when a distance to the detected object is a predetermined reference distance, which corresponds to the estimated size in the real space of the detected object.

5. A non-transitory recording medium in which a distance estimation computer program is recorded for causing a computer to execute:

detecting a predetermined object represented in an image acquired by a camera, and calculating, by inputting the image to a classifier that calculates a confidence score representing likelihood that, for each of a plurality of types of the predetermined object, the detected object belongs to the type, a size of the detected object and the confidence score for each of the plurality of types;

estimating a size in the real space of the detected object by weighted-averaging, for each of the plurality of types, a reference size in the real space of the type being stored in a memory by the confidence score of the type; and estimating a distance to the detected object, based on a ratio between the size of the detected object on the image and an estimated size of the detected object on the image when a distance to the detected object is a predetermined reference distance, which corresponds to the estimated size in the real space of the detected object.

* * * * *